(12) United States Patent
Hudson et al.

(10) Patent No.: US 7,221,150 B2
(45) Date of Patent: May 22, 2007

(54) TOOTHED SHELL ON A VARIABLE RELUCTANCE SPEED SENSOR

(75) Inventors: Cynthia A. Hudson, Jacksonville, FL (US); Randal Parker Bold, Jacksonville, FL (US); Wesley Raymond Bankard, Jacksonville, FL (US)

(73) Assignee: Unison Industries LLC, Jacksonville, FL (US)

( * ) Notice: Subject to any disclaimer, the term of this patent is extended or adjusted under 35 U.S.C. 154(b) by 26 days.

(21) Appl. No.: 10/965,433

(22) Filed: Oct. 14, 2004

(65) Prior Publication Data

US 2006/0082365 A1    Apr. 20, 2006

(51) Int. Cl.
*G01B 7/14* (2006.01)
*G01P 3/42* (2006.01)

(52) U.S. Cl. .................. 324/207.15; 324/174
(58) Field of Classification Search ........... 324/207.15, 324/174
See application file for complete search history.

(56) References Cited

U.S. PATENT DOCUMENTS

| | | | |
|---|---|---|---|
| 6,359,430 B1 * | 3/2002 | Palfenier et al. | 324/174 |
| 6,484,592 B2 * | 11/2002 | Sezaki | 73/862.335 |
| 6,876,194 B2 * | 4/2005 | Lin et al. | 324/163 |

* cited by examiner

*Primary Examiner*—Reena Aurora
(74) *Attorney, Agent, or Firm*—Leydig, Voit & Mayer, Ltd

(57) ABSTRACT

An improved variable reluctance speed sensor configuration yields increased signal strength for a given sensor element diameter and/or sensor-to-speed wheel spacing. The improved sensor according to various embodiments of the invention comprises a plurality of passages containing pole pieces. The surface of the housing facing the speed wheel has thereon one or more projections. This sensor housing configuration concentrates magnetic flux in the housing when the speed wheel teeth are not aligned with the pole pieces. In particular, the projections act as flux concentrators, increasing the flux differential in the pole pieces as the speed wheel teeth pass the sensor.

12 Claims, 8 Drawing Sheets

TOOTHED SHELL ON A VARIABLE RELUCTANCE SPEED SENSOR

FIELD OF THE INVENTION

The present invention relates generally to variable reluctance speed sensors and, more particularly, to a variable reluctance speed sensor having a configuration for increasing the amplitude of the sensed signal for a given pole piece or sensor assembly diameter.

BACKGROUND OF THE INVENTION

Prior to discussing embodiments of the invention, a general background of the invention will be given, keeping in mind that the recognition of a problem by the applicant may itself comprise at least a portion of the invention. Variable reluctance magnetic transducers such as those used in speed sensing applications are well known. Speed sensing applications generally entail detecting the rotational velocity of a rotating member such as a turbine in an aircraft engine (e.g., to perform speed control) or a wheel on a car (e.g., to perform anti-lock braking). The sensor portion of a variable reluctance speed sensing circuit generally comprises one or more permanent magnets in contact with one or more associated pole pieces formed from a ferrous material. There are a number of ways to arrange the pole pieces and magnets with respect to one another; however a typical technique is to place each pole piece and its respective magnet in an end-to-end relationship. The opposite end of each pole piece, i.e., the end not adjacent to a magnet, is situated near ferrous elements attached to the rotating object of interest, e.g. a speed wheel.

Each pole piece is surrounded by an electrically conductive coil. Changes in magnetic flux through the pole piece will be sensed as electrical changes in the coil, i.e., a voltage level change across the coil or a current change through the coil. Sensing circuitry attached to the coils typically translates the frequency of such electrical changes into a frequency of rotation with respect to the rotating object of interest.

A magnetic field extends from one pole of the magnet, through the pole piece or sensor housing, and then through the air or an adjacent magnetic flux return structure to the other end of the magnet. When a ferrous material is placed near the tip of a pole piece, the reluctance of the magnetic circuit through that pole piece decreases. When this occurs, the strength of the magnetic field in the pole piece increases. Similarly, when the ferrous material is moved away from the pole piece, the strength of the magnetic field in the pole piece decreases.

Changes in magnetic flux within the pole piece induce a corresponding voltage in the coil surrounding the piece. The direction of the induced voltage depends upon the direction of the change in flux. In other words, when the strength of the magnetic field increases, it induces a voltage in the coil in one direction and, when it decreases, it induces a voltage in the opposite direction. Thus it can be appreciated that the approach and departure of one ferrous object to the pole piece induces one cycle of AC voltage.

Since each passage of a ferrous object induces a voltage cycle, the frequency of such cycles can be used to indicate the frequency of passage of ferrous objects. Where the ferrous objects are located on a rotational member such as a speed wheel, this voltage frequency also gives a proportional indication of the speed of rotation of the rotational member.

In order for the induced voltage cycles to be successfully detected for use in speed detection, monitoring, etc., they must be of sufficient magnitude relative to background noise in the signal. The strength of the induced voltage is proportional to the rate of change of magnetic flux in the magnetic circuit, and thus is roughly proportional, up to a point, to the speed of rotation of the body of interest. However, there are other factors that strongly influence the strength of the induced voltage.

For example, the cross-sectional area of the sensor assembly pole piece will constrain the amount of flux passing through the pole piece, such that for smaller diameter pole pieces, the induced voltage may be noticeably decreased. As such, it is difficult to minimize the pole piece footprint while maintaining a sufficient signal-to-noise ratio. The induced voltage is also proportional to the number of turns in the sensor element coil(s). Thus, it is also difficult to minimize the coil diameter while maintaining a sufficient signal-to-noise ratio. The use of multiple sensing elements (i.e. pole/coil assemblies) in a single sensor assembly also limits the coil diameter.

Exacerbating these problems in many environments is the requirement for a large distance between the sensor assembly and the speed wheel due to geometric tolerances, unbalance, clearances, and hot/cold cycles. In addition, the first element to modify the signal is often relatively distant from the sensor assembly itself. Thus the induced signal can decay over the transmission distance prior to use, and additional noise may enter the signal in the leads from the sensor.

An example of such an environment is in aircraft engine monitoring technology, where the variable reluctance sensor is internal to the engine, while the first electronic controller may be located tens of feet away. In addition, in such environments and others, there is little extra space, and thus the sensor assembly and its sensing elements must be compact. Thus, there is a need for a compact sensor element and assembly that can provide a sensed signal of sufficient amplitude and signal-to-noise ratio, even if the sensor assembly is constructed with decreased diameter or greater number of sensing elements relative to traditional sensor assemblies, and/or if the sensor-to-speed wheel distance is increased.

BRIEF DESCRIPTION OF THE INVENTION

The invention provides, in various embodiments, an improved variable reluctance speed sensor having a configuration that yields increased signal strength for a given sensor assembly or sensor element diameter, etc. The improved sensor according to various embodiments of the invention is used in an operating environment that includes a rotating speed wheel adjacent to the sensor. The speed wheel comprises an alternatingly magnetic and nonmagnetic structure. Nonmagnetic elements can include air, epoxy, etc., while magnetic elements typically comprise a ferrous metallic structure. An example of a speed wheel is a wheel that has teeth thereon, and as the speed wheel rotates, the teeth pass by the sensor. The teeth typically comprise a ferrous material capable of passing magnetic flux. Other types of speed wheels include slotted disks or rings comprising ferrous material. Note that there is a magnetic path between the teeth to complete a low reluctance flux path through any combination of teeth. Typically this path is provided by the body of the speed wheel itself when it is constructed of the same material as the teeth (or of another ferrous material).

The sensor housing according to an embodiment of the invention is generally cylindrical with a plurality of passages containing sensor elements. The front surface of the housing, i.e. the surface facing the speed wheel, has thereon a plurality of projections to the sides of and/or between the pole piece passages. Any number of projections may be used depending upon the number of pole pieces and the cross-section of the housing, as well as other design considerations. The projections are linear and arranged parallel to one another in an embodiment of the invention; however, other arrangements are contemplated. For example, the projections may be circular, square, or other nonlinear shape, and may be arranged on the face of the sensor housing in a symmetrical or nonsymmetrical manner as dictated by design decisions in any particular instance.

The spacing of the projections on the face of the sensor housing may be set according to the same general constraint used for pole pieces. That is, the projections are preferably located such that a group of consecutive magnetic elements of the speed wheel align with a number of projections or alternatively with a number of pole pieces. To maximize the flux differential in the pole pieces, it is preferable that the speed wheel teeth (or other periodic ferrous structure adjacent to the sensor) are spaced at the same spacing as the pole pieces in the direction of rotation, and are substantially the same width or less compared to the pole piece width in that direction. The described sensor housing projections switch magnetic flux through the housing when the speed wheel magnetic elements are not aligned with the pole pieces. When the speed wheel magnetic elements are aligned with the pole pieces, the gaps between the projections act to switch magnetic flux through the pole pieces. Thus, the projections and gaps essentially act as flux switches, increasing the flux differential in the pole pieces as the speed wheel magnetic elements pass the sensor.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
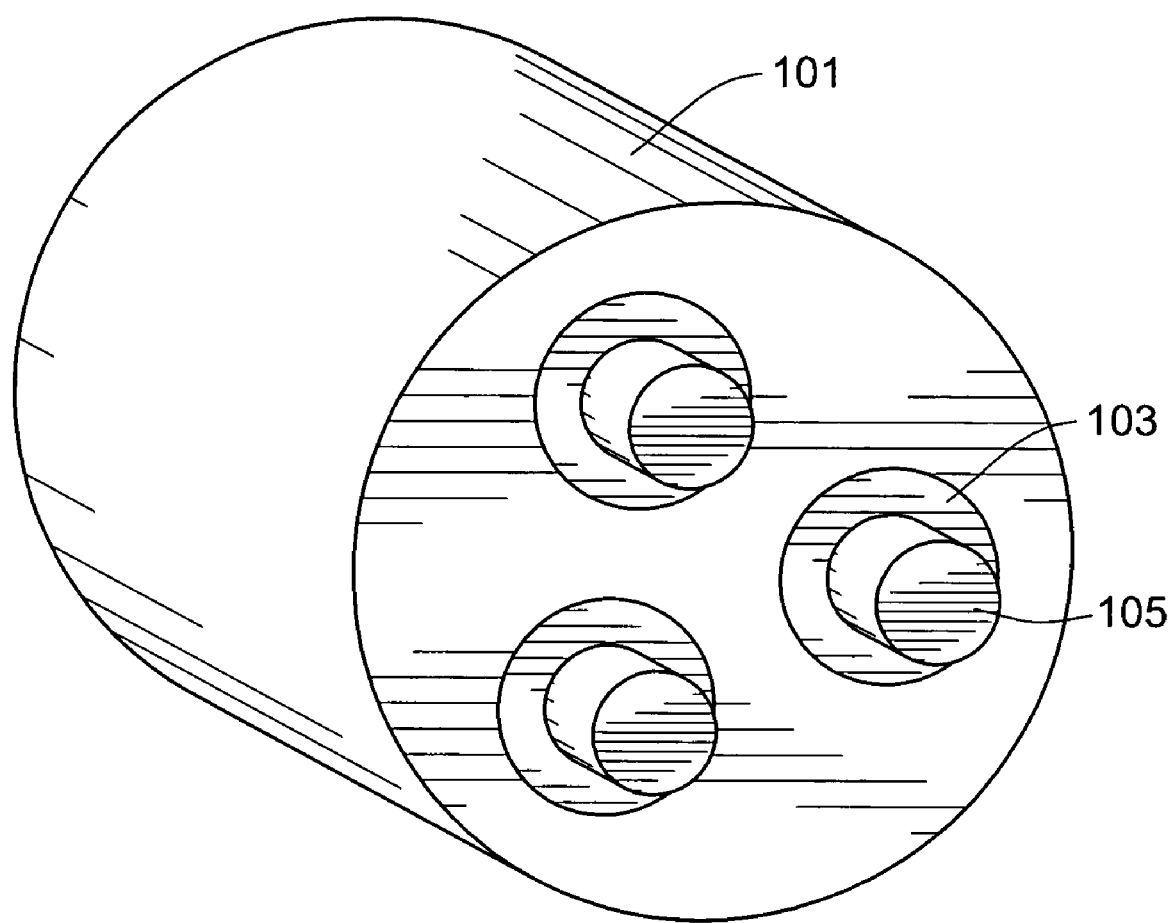
FIG. 1 is a perspective front view of a variable reluctance sensor head without projections and having three sensor channels.

In order to facilitate understanding of various embodiments of the invention, an existing variable reluctance sensor configuration will be discussed. It will be appreciated that the term "variable reluctance" as used herein refers primarily to the traditional concept of variable magnetic reluctance, but is not intended to exclude other types of reluctance and/or permittivity phenomena. Referring to FIG. 1, a perspective front view of a traditional variable reluctance sensor head 100 is shown. The sensor assembly 100 comprises a housing 101 having therein cylindrical passages 103. The housing 101 is of a ferrous material capable of passing magnetic flux. Typically, the composition and processing of the housing 101 contribute to this ability. The cylindrical passages 103 each house a pole piece 105. Each pole piece 105 is comprised of a ferrous material also capable of passing flux. A gap between each pole piece 105 and the respective opening 103 allows space for a pickup coil, not shown, wrapped around the pole piece 105. The gap may be filled with epoxy or potting compound to isolate the pole 105 and coil from the housing 101.

Typically, the prior art variable reluctance speed sensors used in aircraft jet engine applications comprised no more than three poles. The reason for this is that the overall size of the sensor is limited by size constraints within the operating environment, typically an engine frame strut. Increasing the number of sensor elements without also increasing overall sensor assembly dimensions would require making each sensor element smaller, and as such the sensed voltages would be smaller to the point that an acceptable signal-to-noise ration would be difficult to obtain. However, increasing the number of sensor element would be desirable, so as to provide increased redundancy and/or to support additional uses of the output signals.

Figure 2A:
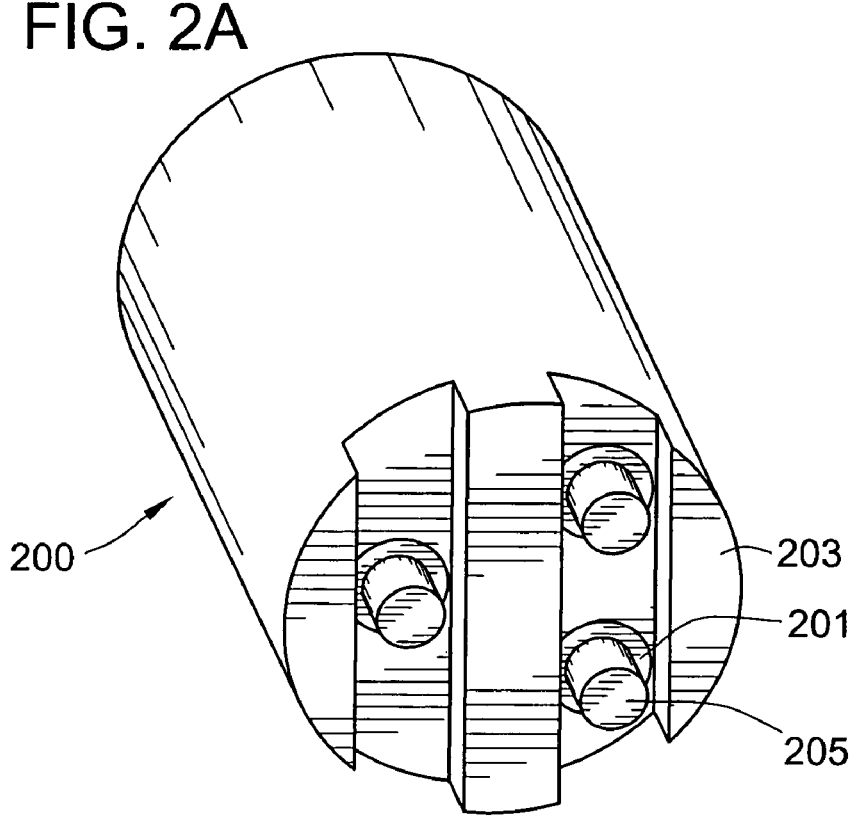
FIG. 2A is a perspective front view of a variable reluctance sensor head according to an embodiment of the invention.

FIG. 2A illustrates a variable reluctance speed sensor housing 200 according to an embodiment of the invention. The housing 200 is generally cylindrical with three passages 201 for receiving pole pieces 205. The housing may additionally comprise an internal central recess, not shown, open to the rear of the housing 200. This central recess may be used to run electronic leads from coils which surround the pole pieces within the passages 201.

The housing 200 is preferably constructed primarily of a magnetic material. The front surface of the housing 200 has formed thereon a plurality of projections 203 to the sides of and between the pole piece passages 201. Although three such projections are shown, a lesser or greater number of projections may be used within embodiments of the invention. Moreover, although the projections 203 are illustrated as having major dimensions (i.e. their longest dimension related to one or more sides) parallel to one another, the invention is not so limited. For example, the projections 203 may be circular, square, or any other suitable shape, and may be arranged on the face of the sensor housing 200 in a symmetrical or nonsymmetrical manner. The major dimensions of the projections 203 are substantially parallel to the face or front surface of the housing 100. The spacing of the projections 203 is preferably set according to the same general constraint used for pole pieces. In particular, the projections should be located such that the teeth of the speed wheel (e.g., either projecting teeth or interstitial material between slots in a disk or ring as will be shown in FIGS. 8A and 8B) will be either over the projections 203 or over the pole pieces 205. Thus, the spacing between consecutive projections 203 is substantially the same, in an embodiment of the invention, as the spacing between consecutive speed wheel teeth (in the direction of passage of the teeth). As shown, two of the projections 203 are located at the perimeter of the sensor face, while a third projection separates the pole pieces.

The sensor housing 200 may be formed by traditional process including casting and/or machining, as well as annealing. Thus the projections 203 may be formed by additional casting or machining steps, with appropriate care taken not to disturb the magnetic properties of the housing. For example, if the projections are to be machined and the housing to be annealed, it is preferable to anneal the housing after the machining is complete. The material of the housing 200 may be any suitable magnetic material including those used for traditional variable reluctance sensor housings as discussed above.

Once the housing 200 is formed, pole pieces and their respective coils are placed within the passages 201. The pole pieces may be placed such that the frontal surfaces of the pole pieces, i.e. the surfaces to face the speed wheel, are generally flush with the tops of the projections 203. However, such is not required, and the pole pieces may extend beyond the tops of the projections 203 or may stop shy of the tops of the projections 203.

Figure 2B:
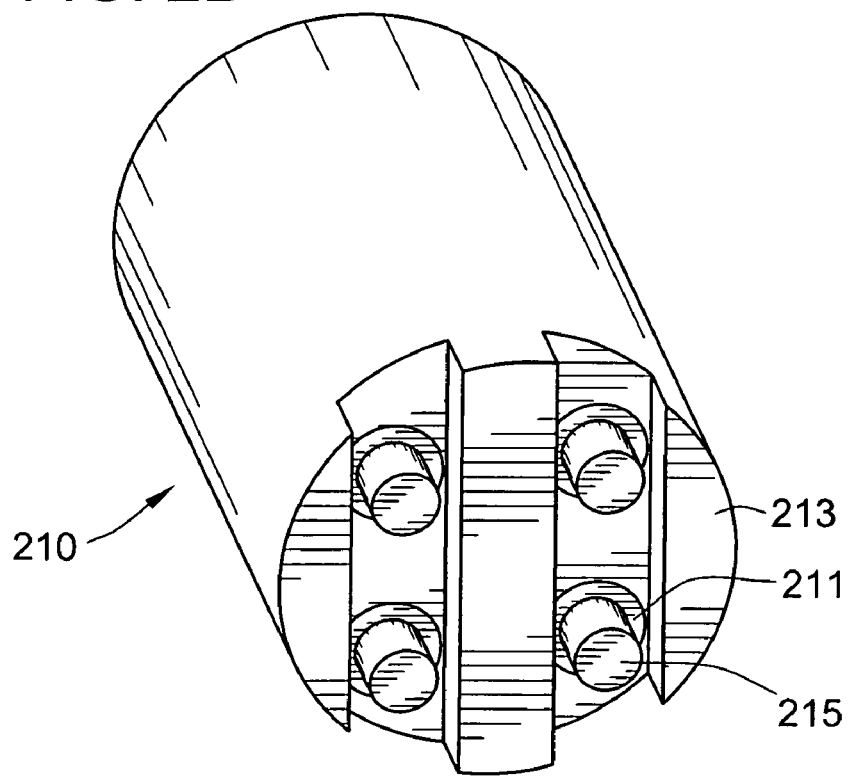
FIG. 2B is a perspective front view of a variable reluctance sensor head according to another embodiment of the invention.

FIG. 2B illustrates a variable reluctance speed sensor housing 210 according to another embodiment of the invention. The housing 210 is generally cylindrical with four passages 211 for receiving pole pieces 215. The housing 210 may additionally comprise an internal central recess, as discussed above. The front surface of the housing 210 comprises three projections 213 to the sides of and between the pole piece passages 211. The spacing of the projections 213 is preferably set according to the same general constraints discussed above.

Figure 2C:
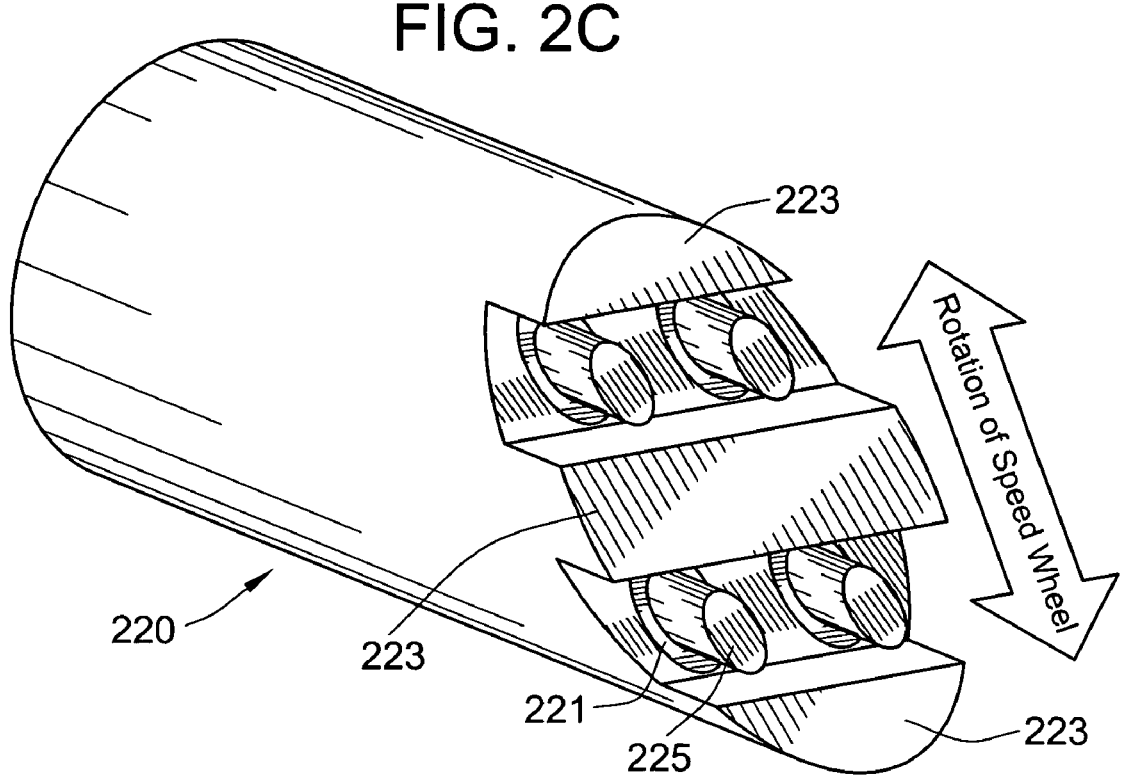
FIG. 2C is a perspective front view of a variable reluctance sensor head according to an alternative embodiment of the invention.
Figure 2D:
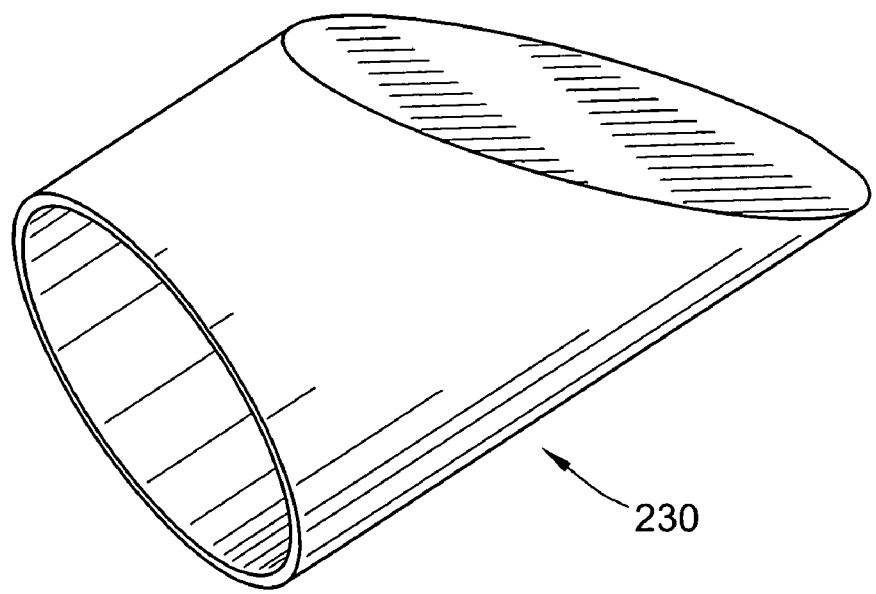
FIG. 2D is a perspective rear view of a variable reluctance sensor head cap according to an embodiment of the invention.

FIG. 2C illustrates a sensor assembly according to another embodiment of the invention. In the illustrated embodiment of the invention, the face of the sensor housing 220 is cut at an angle, such that the face has an oval cross section. The projections 223 are illustrated as being oriented parallel to the short axis of the oval face, although such is not required. In an alternative embodiment of the invention, the projections 223 are oriented parallel to the long axis of the oval, i.e. rotated 90 degrees in the plane of the oval face from the illustrated orientation. In either embodiment of the invention, the faces of the pole pieces 225 may be cut at the same angle. A nonmagnetic cap, such as illustrated by cap 230 in FIG. 2D, may be used to hermetically seal the face of the sensor assembly 220. This is especially useful in environments wherein debris or chemicals may damage the face of the sensor assembly 220. The cap 230 is preferably as thin as possible to avoid increasing the sensor to speed wheel distance overly, and may be for example 0.010″ thick nonmagnetic material such as Inconel, or various nonmagnetic stainless steel alloys.

Figure 3:
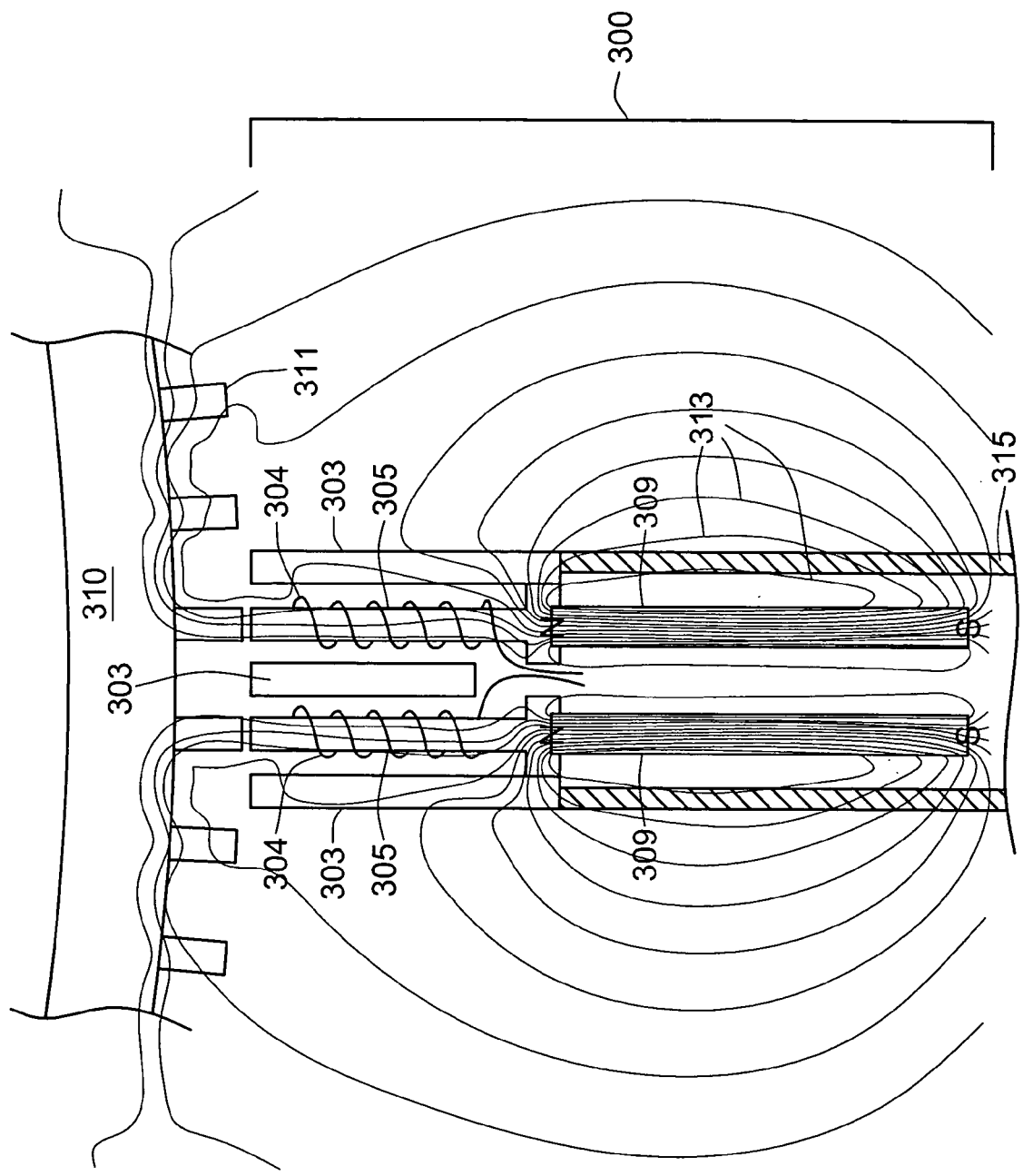
FIG. 3 is a cross-sectional side view of a sensor assembly according to an embodiment of the invention and its environment, wherein the speed wheel teeth are in a first alignment with the sensor assembly.
Figure 4:
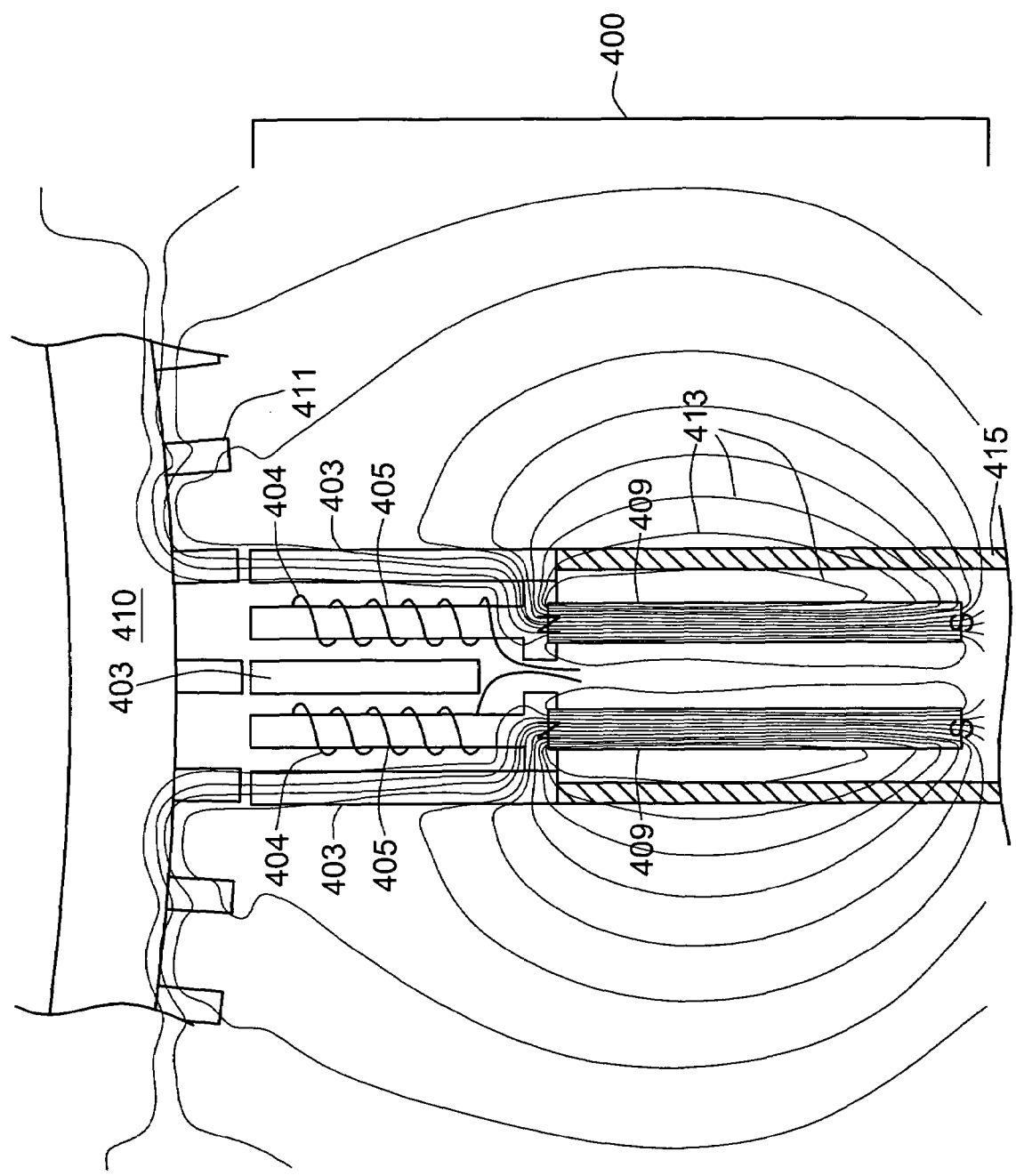
FIG. 4 is a cross-sectional side view of a sensor assembly according to an embodiment of the invention and its environment, wherein the speed wheel teeth are in a second alignment with the sensor assembly.
Figure 5A:
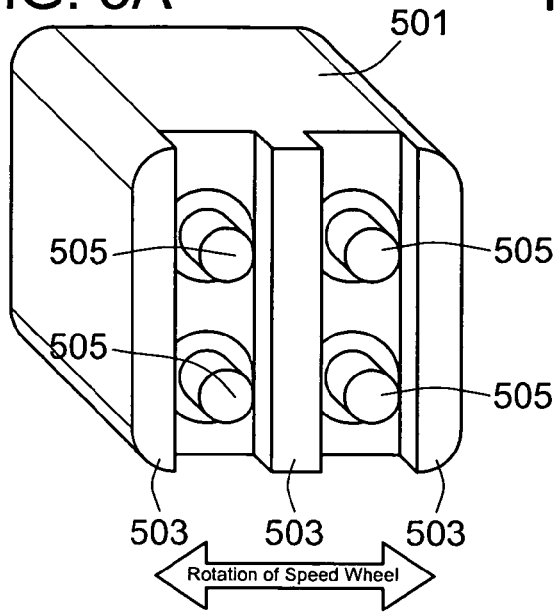
FIGS. 5A–5E illustrate in frontal perspective view a number of alternative housing configurations according to alternative embodiments of the invention.
Figure 5B:
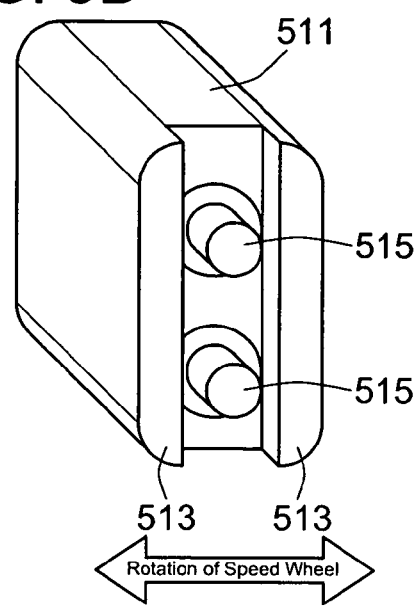
Figure 5C:
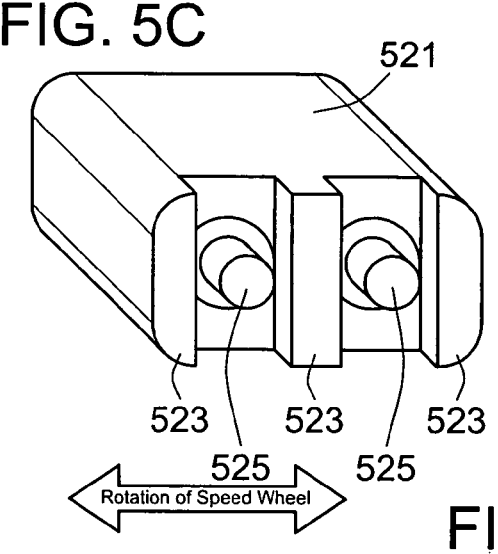
Figure 5D:
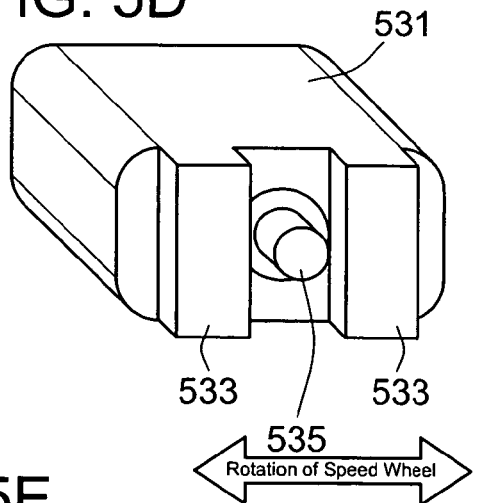
Figure 5E:
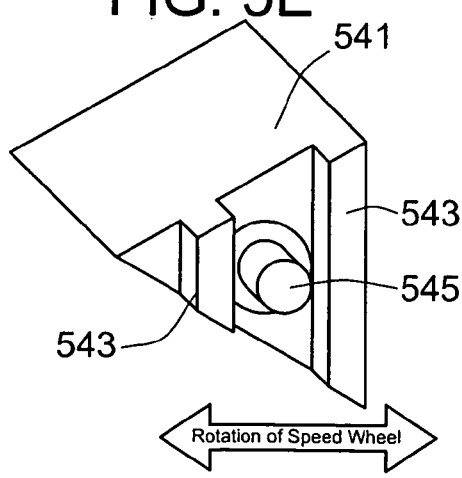

Referring again to FIG. 2A, the projections 203 act as flux concentrators, increasing the flux differential in the pole pieces as the speed wheel teeth pass the sensor. FIGS. 3 and 4 illustrate the manner in which this occurs. In particular, FIGS. 3 and 4 illustrate a sensor according to an embodiment of the invention, and its operating environment, including a speed wheel, wherein the speed wheel is shown in two different respective positions as it rotates relative to the sensor. The sensor, speed wheel, and environmental components are labeled as follows: sensor assembly 300, 400; housing projections 303, 403; pole coils 304, 404; pole pieces 305, 405; magnets 309, 409; speed wheel 310, 410; speed wheel teeth 311, 411; flux lines 313, 413; and nonmagnetic sheath 315, 415. The coils 304, 404 surround the pole pieces 305, 405 to detect flux shifts therein. The magnets 309, 409 are positioned so that they extend into respective recesses at the rear of the pole pieces 305, 405 and provide flux for the flux circuit comprising portions of the sensor assembly 300, 400 and the speed wheel 310, 410. As noted above, there is a magnetic path between the teeth to complete a low reluctance flux path through any combination of teeth. In addition, in order to maximize the flux differential in the pole pieces, it is preferable that the speed wheel teeth are spaced at the same spacing as the pole pieces in the direction of rotation, and are substantially the same width or less compared to the pole piece width in that direction.

In the illustrated arrangement of FIG. 3, the teeth 311 of the speed wheel 310 are aligned with the pole pieces 305 and not with the projections 303 on the sensor housing. The flux lines originating from the magnets 309 are shown as lines 313. As shown, the flux lines pass predominantly through the pole pieces 305 with some leakage through the sensor housing via the projections 303. Note that the magnets 309 are oriented in the same direction, e.g. the north pole of each is adjacent the respective pole piece 305. Alternatively, a single magnet for two or more pole pieces may be used instead of separate magnets 309 for each. In an embodiment of the invention, the single magnet may comprise a hollow tubular structure, the opening being used for passing the leads from the coils 304 past the magnet 309. A nonmagnetic sheath 315 holds the assembly 300 and shields the leads coming from the coils 304. The coils 304 act to inductively detect flux variations in the pole pieces 305.

In the illustrated arrangement of FIG. 4, the teeth 411 of the speed wheel 410 are aligned with the projections 403 on the sensor housing rather than the pole pieces 405. The flux lines originating from the magnets 409 are shown as lines 413. As shown, the flux lines now pass predominantly through the sensor housing via the projections 403 thereon, with only negligible flux leakage through the pole pieces 405. Thus, the flux differential through the pole pieces 405 as the teeth 411 pass by the sensor assembly 400 is greatly enhanced over that attainable with prior art sensor housing arrangements. Again, the coils 404 act to inductively detect flux variations in the pole pieces 405. The heightened flux switching provided by the housing configuration in embodiments of the invention thus provides an increased signal in the coils 404. A nonmagnetic sheath 415 holds the assembly 400 and shields the leads coming from the coils 404.

This enhanced sensor efficiency can be used to great advantage. For example, for a given pole diameter, use of the improved housing will provide a higher magnitude voltage signal, thus improving frequency resolution and allowing longer lead lines between the sensor and the first element for use or modification of the signal. Moreover, the increased efficiency provided by the improved housing allows the use of smaller diameter pole pieces and coils without decreasing the sensed signal strength to an unusable level. Thus, a greater number of pole pieces may be used in the same space, providing enhanced redundancy or functionality. Alternatively, the same number of pole pieces may be used in a smaller than normal sensor housing, providing for a more compact sensor installation.

Data gathered on sample sensors that include the projections according to various embodiments of the invention confirm that the flux shunting is increased by the projections. For such a device, having coils of 6130 turns of 40 AWG wire, facing a 43-tooth speed wheel from 0.064", an 832 mV magnitude induced signal was detected at 120 RPM (about 86 Hz). Under the same test conditions, a similar sensor assembly lacking the projections produced only a 640 mV signal.

Although the improved sensor housing discussed above was illustrated having a circular cross-section, the invention is not limited to housings of circular cross-section. FIG. 5 illustrates a number of other housings having different configurations, and it will be understood that these configurations and configurations other than those shown are also usable within the invention. Housing 501 is of a square cross-section, having three projections 503 and four pole passages 505. Housing 511 is of a rectangular cross-section, having two projections 513 and two pole passages 515. Housing 521 is of a rectangular cross-section, having three projections 523 and two pole passages 525. Housing 531 is of a square cross-section, having two projections 533 and one pole passage 535. Finally, housing 541 is of a triangular cross-section, having two projections 543 and one pole passage 545.

Figure 6:
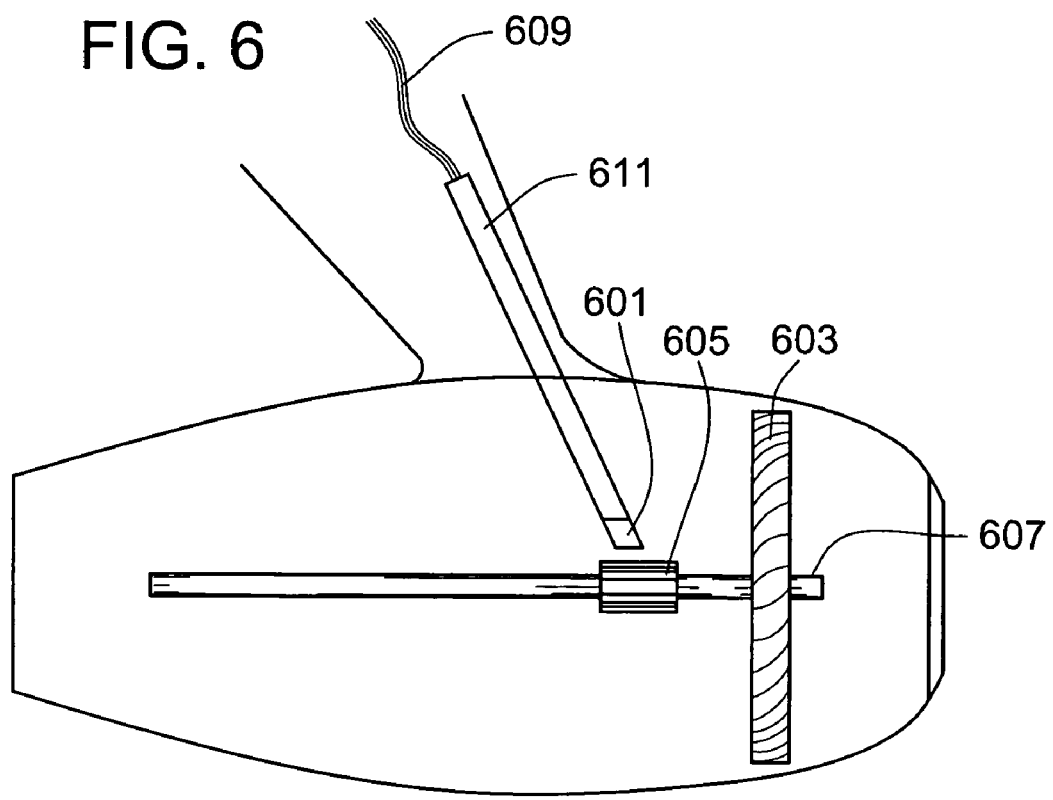
FIG. 6 illustrates the location of a sensor according to an embodiment of the invention in an operating environment within the engine of an aircraft.

FIG. 6 illustrates the placement of an improved sensor in a typical operating environment. In the illustrated example, the sensor 601 is located within the engine 603 of an aircraft, not shown. The sensor 601 is located adjacent a speed wheel 605 attached to the engine main shaft 607. Leads 609, typically twisted pair cables of suitable diameter, conduct signals from the sensor coils of the sensor 601 to circuitry and instrumentation within the aircraft. Typical uses of these signals include engine RPM monitoring, throttle control, and vibration detection. Redundant sensor poles typically use redundant leads as well, so that in the event of a failure in one or more of the pole, the coil, or the leads, redundancy is nonetheless maintained. A nonmagnetic sheath 611 holds the sensor 601 in place and also shields the leads 609 as they exit the device.

Figure 7:
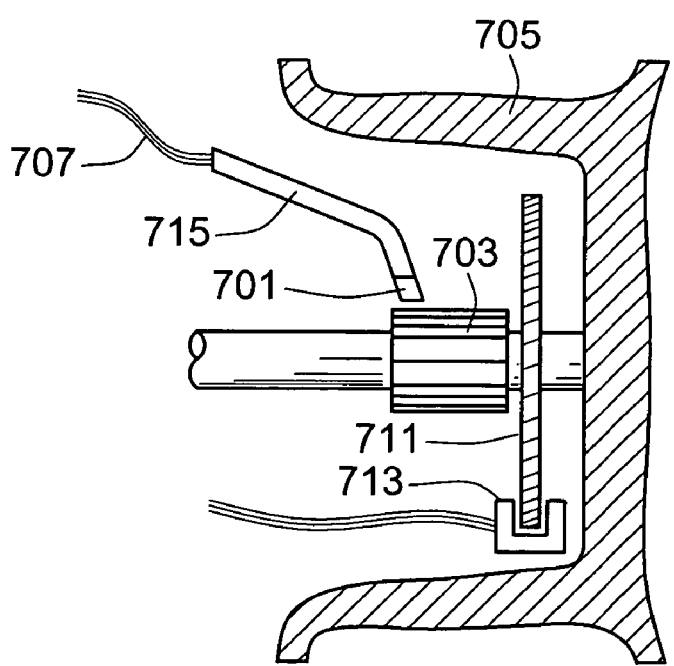
FIG. 7 illustrates the location of a sensor according to an embodiment of the invention adjacent a speed wheel attached to a wheel of a vehicle.

FIG. 7 illustrates the placement of an improved sensor in another operating environment. In the illustrated example, the sensor 701 is located adjacent a speed wheel 703 attached to a wheel 705 of a vehicle, not shown. Leads 707, again typically twisted pair cables of suitable diameter, conduct signals from the sensor coils of the sensor 701 to circuitry and instrumentation within the vehicle. As in other applications, a nonmagnetic sheath 715 can be used to hold the sensor 701 in place and to shield the leads 707 as they exit the device 701. Typical uses of these signals include vehicle speed measurement, mileage measurement, and antilock braking, such as via brake disc 711 and caliper 713. As discussed with respect to FIG. 6, redundant sensor poles typically use redundant leads as well.

Figure 8A:
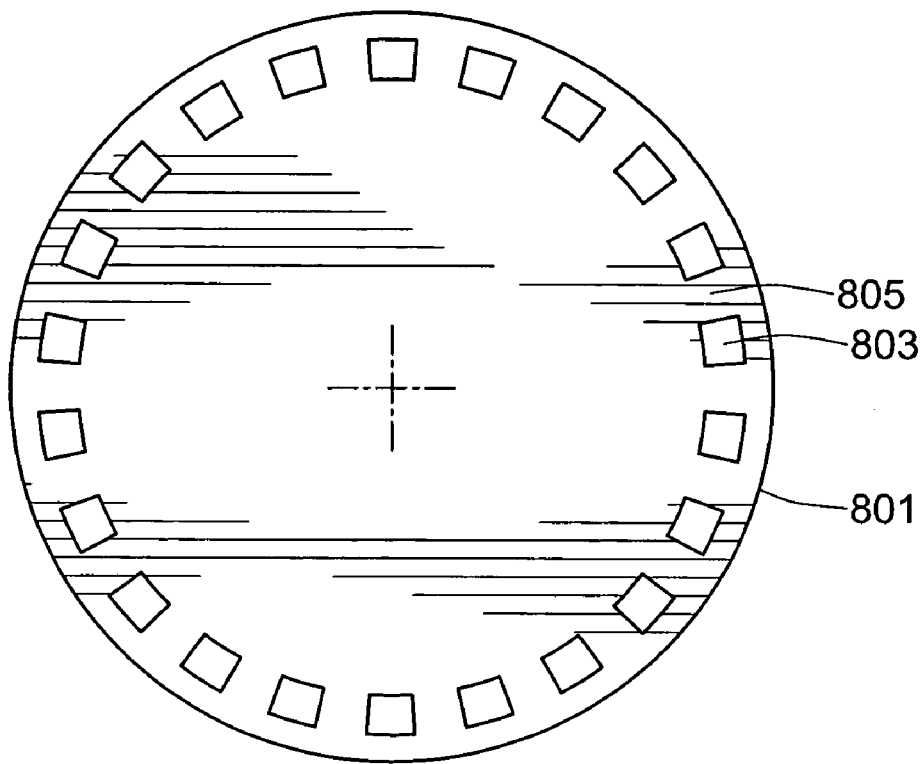
FIG. 8A is a frontal view of a speed wheel having an alternative configuration suitable for use with sensor assemblies according to various embodiments of the invention.
Figure 8B:
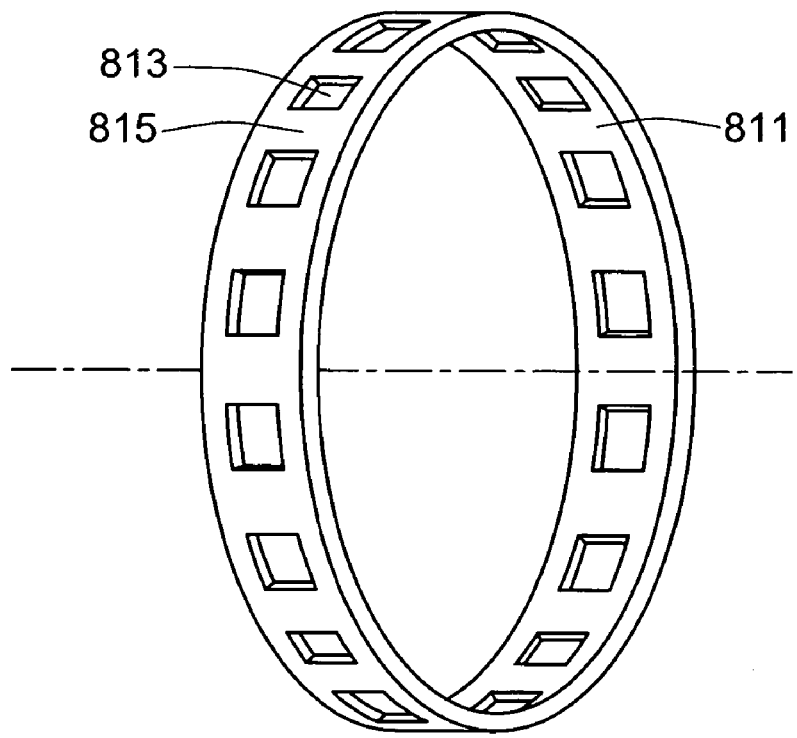
FIG. 8B is a perspective side view of a speed wheel having another alternative configuration also suitable for use with sensor assemblies according to various embodiments of the invention.

Although the sensor assembly according to various embodiments of the invention has been discussed above by reference to a circumferentially toothed speed wheel, other speed wheel configurations are also suitable for use with the invention. FIGS. 8A and 8B illustrate two alternative configurations. FIG. 8A is a frontal view of a speed wheel having a slotted construction. In particular, the speed wheel 801 is configured as a disk having therein slot openings 803. The openings 803 leave intact a plurality of slot separators 805. In operation, a variable reluctance speed sensor assembly is placed such that as the speed wheel 801 turns, the slot openings 803 and separators 805 alternate in front of the assembly. In this manner, the slot separators 805 act in a manner similar to the teeth of a circumferentially toothed speed wheel.

FIG. 8B is a perspective side view of a speed wheel having another alternative configuration also suitable for use with sensor assemblies according to various embodiments of the invention. The speed wheel 811 of FIG. 8B is configured as a ring comprising slot openings 813. The openings 813 leave intact a plurality of slot separators 815. In operation, a variable reluctance speed sensor assembly is placed such that as the speed wheel 811 turns, the slot openings 813 and separators 815 alternate in front of the assembly. As with the configuration of FIG. 8A, the slot separators 815 act in a manner similar to the teeth of a circumferentially toothed speed wheel.

It will appreciated that a new and useful speed sensor housing and assembly have been described herein in a manner so as to enable those of skill in the art to practice the invention. In view of the many possible embodiments to which the principles of this invention may be applied, it should be recognized that the embodiments described herein with respect to the drawing figures are meant to be illustrative only and should not be taken as limiting the scope of invention. It is contemplated that the illustrated embodiments can be modified in arrangement and detail without departing from the spirit of the invention. Therefore, the invention as described herein contemplates all such embodiments as may come within the scope of the following claims and equivalents thereof.

We claim:

1. A variable reluctance motion sensor housing for use adjacent a body of interest having at least one ferrous projection, and for detecting motion of the body of interest, the sensor housing comprising:
   at least one cylindrical pole piece opening having an axis, the opening passing through a first face of the sensor housing along the axis, wherein the at least one cylindrical pole piece opening comprises a plurality of pole piece openings,
   at least one housing projection extending from the first face of the sensor housing in at least a direction substantially parallel to the axis of the cylindrical pole piece opening wherein the at least one housing projection comprises three housing projections, and wherein the three housing projections comprise first and second projections at the outer perimeter of the first face and a third projection situated to substantially separate one or more pole piece openings from one or more other pole piece openings.

2. A variable reluctance motion sensor housing for use adjacent a body of interest having at least one ferrous projection, and for detecting motion of the body of interest, the sensor housing comprising:
- at least one cylindrical pole piece opening having an axis, the opening passing through a first face of the sensor housing along the axis; and
- at least one housing projection extending from the first face of the sensor housing in at least a direction substantially parallel to the axis of the cylindrical pole piece opening,
- wherein the sensor housing is cylindrical, having an axis of cylindrical symmetry, and wherein the first face of the housing is tilted from perpendicular with respect to the axis of cylindrical symmetry.

3. A variable reluctance motion sensor for use adjacent a body of interest having at least one ferrous projection, and for detecting motion of the body of interest, the sensor comprising:
- a sensor housing having a first face;
- a plurality of pole pieces extending along a longitudinal dimension through the first face of the sensor housing;
- a permanent magnet adjacent to and substantially coaxial with each pole piece; and
- three housing projections extending from the first face of the sensor housing in at least a direction substantially parallel to the longitudinal dimension of the at least one pole piece, and comprising first and second projections at the outer perimeter of the first face and a third projection situated to substantially separate one or more pole pieces from one or more other pole pieces.

4. A variable reluctance motion sensor for use adjacent a body of interest having at least one ferrous projection, and for detecting motion of the body of interest, the sensor comprising:
- a sensor housing having a first face;
- at least one pole piece, said at least one pole piece extending along a longitudinal dimension through the first face of the sensor housing;
- a permanent magnet adjacent to and substantially coaxial with said at least one pole piece; and
- at least one housing projection extending from the first face of the sensor housing in at least a direction substantially parallel to the longitudinal dimension of the at least one pole piece, wherein the sensor housing is cylindrical, having an axis of cylindrical symmetry, and wherein the first face of the housing is tilted from perpendicular with respect to the axis of cylindrical symmetry of the first face.

5. A variable reluctance speed sensor for use adjacent a speed wheel having a direction of rotation and having a plurality of ferrous projections spaced at a selected spacing in the direction of rotation, the sensor comprising:
- a sensor housing having therein a plurality of pole piece passages, each having therein a pole piece, each pole piece passage having an opening passing through a first face of the sensor housing facing the plurality of ferrous projections of the speed wheel;
- a permanent magnet adjacent each pole piece;
- an electrically conductive coil surrounding each pole piece, whereby changes in magnetic flux through a pole piece will induce an electrical reaction in the respective conductive coil;
- a plurality of housing projections extending from the first face of the sensor housing toward the speed wheel, the plurality of housing projections also being spaced at substantially the selected spacing in the direction of rotation of the speed wheel, whereby the plurality of housing projections act to concentrate magnetic flux through the housing when one or more teeth of the speed wheel align with one or more of the housing projections, wherein the plurality of housing projections comprises three housing projections and wherein the three housing projections comprise first and second projections at the outer perimeter of the first face and a third projection situated to substantially separate one or more pole piece passages from one or more other pole piece passages.

6. The variable reluctance speed sensor according to claim 5, wherein the electrical reaction in the respective conductive coil is an induced voltage.

7. The variable reluctance speed sensor according to claim 5, wherein first and second housing projections of the plurality of housing projections have a major dimension substantially parallel to the first face, and wherein the major dimension of the first housing projection is substantially parallel to the major dimension of the second housing projection.

8. The variable reluctance speed sensor according to claim 5, wherein the sensor housing is cylindrical, having an axis of cylindrical symmetry, and wherein the first face of the housing is tilted from perpendicular with respect to the axis of cylindrical symmetry.

9. The variable reluctance speed sensor according to claim 5, further comprising a nonmagnetic cap over the first face to seal the first face and the plurality of pole pieces from the operating environment of the sensor.

10. The variable reluctance speed sensor according to claim 5, further comprising a nonmagnetic cap over the first face to seal the first face and the plurality of pole pieces from the operating environment of the sensor.

11. The variable reluctance speed sensor according to claim 5, wherein the permanent magnets adjacent respective pole pieces are aligned with like poles in substantially the same direction.

12. The variable reluctance motion sensor according to claim 5, further comprising a hollow nonmagnetic sheath at least partially enclosing the permanent magnet adjacent each pole piece.

* * * * *